Figure 1:
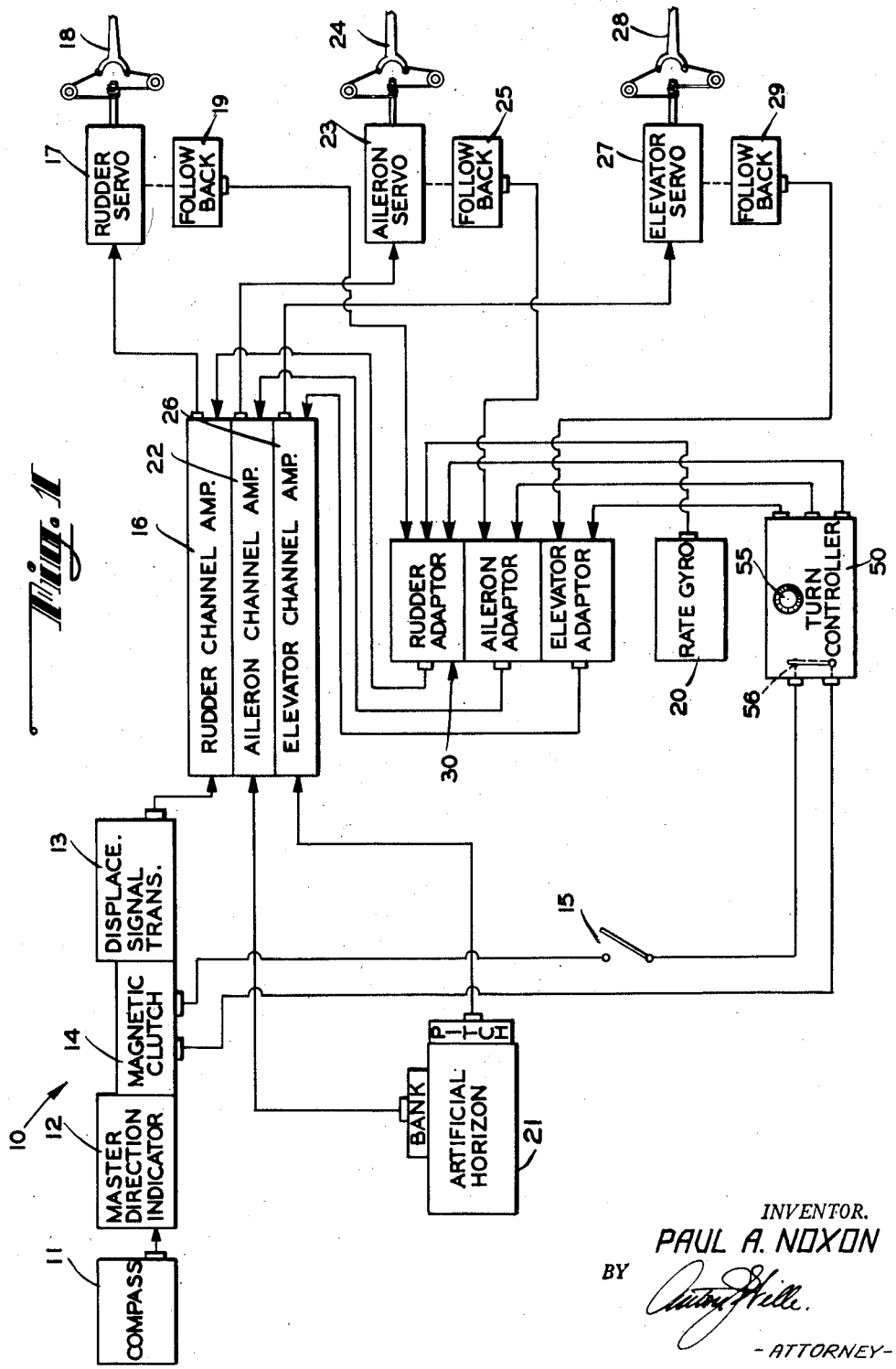

INVENTOR.
PAUL A. NOXON

Patented Feb. 12, 1952

2,585,162

UNITED STATES PATENT OFFICE 2,585,162

COORDINATED TURN CONTROLLER FOR AUTOMATIC PILOT SYSTEMS

Paul A. Noxon, Tenafly, N. J., assignor to Bendix Aviation Corporation, Teterboro, N. J., a corporation of Delaware Application September 18, 1947, Serial No. 774,814

18 Claims. (Cl. 244—77)

1

This invention relates in general to automatic pilot or steering systems for mobile craft, and more particularly to a novel coordinated turn controller to permit proper turns to be made through the pilot system.

In prior automatic pilot systems, provisions have been made to change the direction and attitude of the craft on which the system is mounted by generating artificial signals which were either added to, or overcame the directional and attitude signals of the pilot system for actuating the controlling surfaces to place the craft in a proper turn. The signals thus generated would, through the means provided, move the rudder and aileron surfaces to bring about a banked turn; the rate of turn and attitude signals developed by the pilot system eventually wiping out the created turn signals to bring the craft about on its new heading.

The turn provisions heretofore had, have proven cumbersome in that considerable time was required to make the necessary adjustments and changes in the pilot system to develop the required signals before the desired turn was effected. Such provisions have also proven inadequate in that few systems compensated for the inherent loss of altitude of a plane while making a turn. The loss of altitude during turns is particularly marked when a plane is in a left turn; the diving of the plane being greater than when in a right turn due to the gyroscopic effect of the propeller, or propellers, rotating in a clockwise direction. An "up" elevator position is required to maintain the aircraft at its initial altitude when making a turn, additional compensation being required in left turns. These refinements in automatic navigation are lacking in prior pilot systems, and when found were slow in response, inadequate in altitude compensation, complicated to operate, and added considerable weight to the automatic pilot system.

It is, therefore, an object of my present invention to provide in an automatic pilot for mobile craft, a coordinated turn controller in which but a single element is adjusted to change the direction and attitude of the craft on which the pilot system is mounted.

A further object of this invention is to provide a coordinated turn controller for an automatic pilot system in which compensating provisions are made for the inherent loss of altitude of the aircraft while making a turn, to maintain the craft at substantially its initial altitude.

Still a further object of the present invention is to provide in an automatic pilot system, a

2 turn controller in which additional "up" elevator compensation is made when the aircraft carrying the system is placed in a left turn by adjustment of the single element thereof.

Another object of my invention is to provide a turn controller for an automatic pilot system in which the adjustment of the single element thereof will provide three signal voltages for controlling the rudder, aileron and elevator surfaces of the craft carrying the automatic pilot system to bring the craft about on a properly banked turn and at substantially the same altitude.

Still another object of this invention is to provide in an automatic pilot system, a highly improved and rugged coordinated turn controller of the character indicated which shall consist of few and simple parts, be light in weight, relatively inexpensive to manufacture, simple to operate, quick and positive in its response, and which shall be practical and efficient to a high degree in use.

Other objects of the invention will in part be obvious, and in part hereinafter pointed out.

Figure 2:
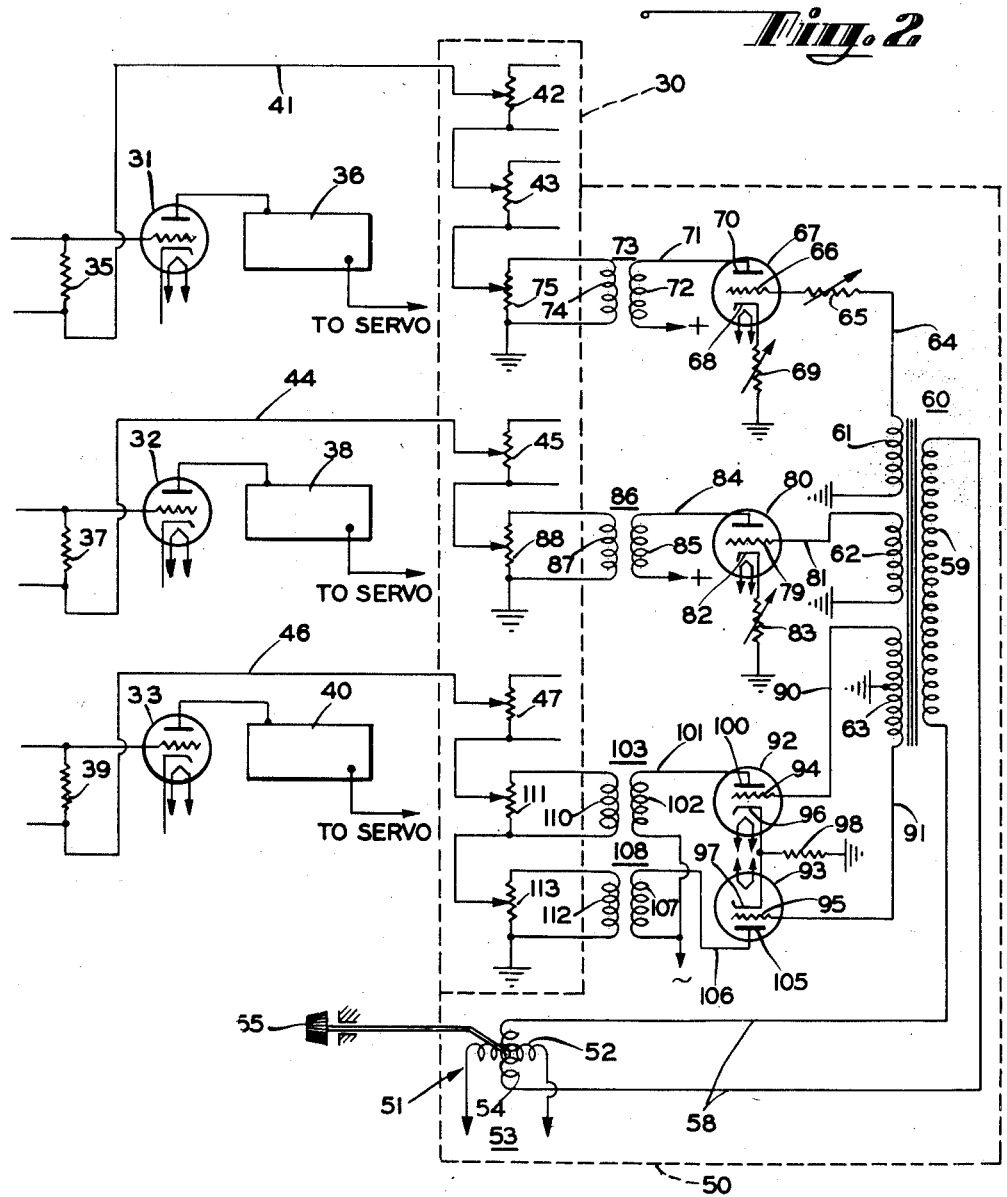
Figure 3:
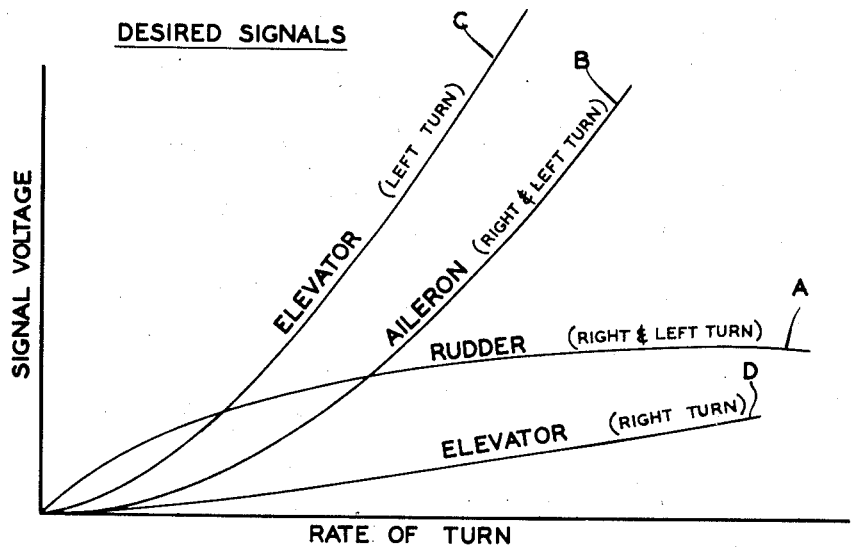
Figure 4:
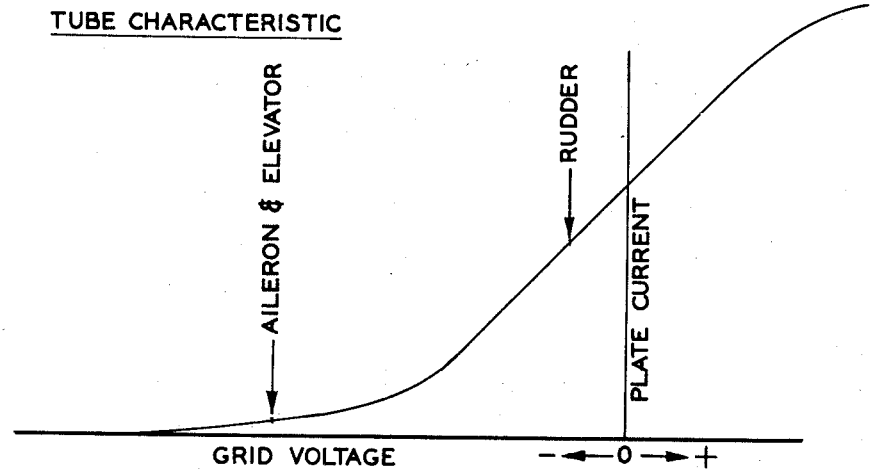

In the accompanying drawings forming a part of this specification in which one of the various possible illustrative embodiments of this invention is shown, and wherein similar reference characters designate corresponding parts throughout the several views, Fig. 1 is a block diagram of an automatic pilot system for mobile craft incorporating my novel coordinated turn controller, Fig. 2 is a schematic wiring diagram of the novel coordinated turn controller and its connections into the automatic pilot system, Fig. 3 is a graph of the characteristic curves showing the desired signal voltage output of the controller, while Fig. 4 is a graph showing a vacuum tube characteristic curve of grid voltage, and the operating ranges thereon for the several signal voltages required.

I accomplish the several objects of my invention by providing a source of variable signal voltage, the amplitude of the signal voltage being determined by the degree of displacement of a control knob, and the polarity of which is determined by the direction of knob displacement. The displacement signal voltage thus obtained is applied through a transformer to the input side of three vacuum tube circuits representing the control circuits for operation of the rudder, aileron, and elevator surfaces of the aircraft. The output of the three circuits is applied in series with the attitude signal voltages of the pilot system to the input circuits of the respective amplifier channels to operate the flight control surfaces accordingly.

The amplitude of the displacement signal voltage to be applied to the several amplifier channels of the pilot system has been empirically determined so that a coordinated turn of the craft is attained upon displacement of the control knob. By using certain vacuum tube characteristics and applying the proper grid bias, I am able to obtain from the three signal voltages derived from the initial displacement signal, an output voltage which satisfies the empirically determined values. A graph of the output voltages thus obtained with the desired rate of turn as the abscissa would reveal a curve for rudder operation which is non-linear, being concave downwardly. For small displacement of the control knob comparatively large rudder signal voltages are impressed on the rudder channel of the pilot system; further displacement increasing the rudder voltages gradually. A plot of the aileron signal voltage would be a curve concave upwardly, small signal voltages being derived for slight displacements of the control knob, the voltages increasing with increasing knob displacement. The curves of both rudder and aileron voltages are symmetrical for right and left turn.

To control the elevator surfaces the signal voltages derived for a left turn are to be larger than those for a right turn to offset the greater loss of altitude when making a left turn. The voltage curves for both right and left turns are concave upwardly, the voltage for a left turn increasing more rapidly in proportion to the rate of turn desired. In elevator control no phase reversal of signal is required; "up" elevator operation at all times being required in changing craft heading.

Referring now to Fig. 1 of the drawings, there is illustrated in block diagram form an automatic pilot system 10, more adequately illustrated in co-pending application for Automatic Pilot bearing Serial No. 516,488 and filed on December 31, 1943 by me, among others. The pilot system 10 is provided with a gyro stabilized earth inductor compass 11 capable of developing direction signal voltages. The direction signal voltages are first amplified (not indicated) and applied to a master direction indicator 12 normally mounted on the instrument panel of the aircraft. The master indicator, when the pilot system is connected to maintain the craft in a prescribed heading, operates a direction signal transmitter 13 through a magnetic clutch 14. The magnetic clutch 14 will be energized when a master switch 15 is closed to couple the transmitter 13 to the indicator 12.

The clutch 14 also comprises a centering device which when the clutch is deenergized will return the transmitter 13 to its zero electrical position. Thus, when the switch 15 is closed, the transmitter 13 will be coupled to the indicator 12 in a zero signal position. Any deviation of the aircraft from the heading indicated at the time of closing switch 15 will result in a displacement signal voltage being developed proportional to the deviation from the prescribed heading.

The displacement voltage of transmitter 13 upon a departure of the craft from the set heading is impressed on the input side of the rudder channel amplifier 16. The direction and magnitude of the craft departure will be indicated by the phase and amplitude of displacement signal. The amplifier 16 will sense and amplify the displacement signal and impress the same on the rudder servo motor 17. The servo motor 17 will be operated in a direction indicated by the phase of the displacement signal, to move the rudder 18 bringing the craft back to its preset heading.

The rudder servo motor in positioning the rudder 18 also positions a follow-back signal transmitter 19 to modify the operation of said motor in accordance with the amplitude of the displacement signal. The follow-back transmitter 19 constitutes a follow-up connection between the displacement signal transmitter 13 and the rudder 18. The follow-back voltage is impressed on the input of the amplifier channel 16 through an adaptor 30, in opposition to the displacement signal voltage. When the two signals are equal, but opposite in sign, the displacement signal of transmitter 13 is nullified, and servo motor 17 is brought to a standstill. The rudder 18 is then in a position called for by the amplitude of displacement signal voltage.

As the aircraft turns, the displacement signal voltage diminishes in value permitting the follow-back voltage to control the operation of the servomotor. Since the follow-back voltage is opposite in sign, the motor 17 will return the rudder to its feathered position.

To prevent the aircraft from overshooting the prescribed heading and thereafter oscillating across the course, a rate of turn gyro 20 is provided in the pilot system 10 having means thereon to provide a signal voltage proportional in amplitude to the rate of turn, and in phase corresponding to the direction of turn. The rate signal is impressed on the input of the amplifier 16 through the adaptor 30, to modify the displacement and follow-back voltages. The rate signal is applied in opposition to the follow-back signal so that the rudder will be applied more rapidly in turning the craft to the preset heading. In returning the angular velocity of the plane will be in an opposite direction, the rate signal now aiding the follow-back signal. The aircraft will settle in its prescribed heading with no oscillation thereabout due to the anticipatory control by the rate signal in turning the rudder in an opposite direction to brake the craft on the heading. Dead beat operation between transmitter 13 and rudder 18 is thus obtained by the addition of the rate of turn signals.

To maintain the air craft in level flight, an artificial horizon gyroscope 21 is provided in the automatic pilot system 10 having means incorporated thereon for developing a signal voltage proportional to the bank angle of the craft for controlling the aileron surfaces, and for developing a signal voltage proportional to the pitch angle of the craft for operating the elevator surfaces.

The bank displacement signal voltage of the artificial horizon 21 is impressed on the input of the aileron channel amplifier 22. The bank signal voltage like the displacement signal, is proportional in amplitude to the angle of bank and in phase in accordance with the direction of bank (left or right). The amplifier will apply the bank signal on the aileron servomotor 23 to operate the motor in a direction consistent with the bank angle to deflect the aileron surfaces 24 to bring the craft to level flight. A follow-back transmitter 25 is positioned by the motor 23 to develop a follow-back voltage. The follow-back voltage is applied to the input of the amplifier 22 through the adaptor 30, in opposition to the bank displacement signal. The operation of the follow-up system thus provided is similar to that described for the rudder channel. A rate signal may also be added to the bank displacement described to provide dead beat operation of the system.

The pitch displacement signals derived from the artificial horizon 21 are applied to the input of the elevator channel amplifier 26 to drive the elevator servo-motor 27. The servo-motor 27 will position the elevator surfaces 28 in a manner similar to that described in connection with the rudder and aileron amplifiers. The servo-motor 27 also positions a follow-back signal transmitter 29 to provide a follow-up system between the artificial horizon gyro and the elevator surfaces 28. A rate signal may also be added to the circuit to provide dead beat operation.

Referring to Fig. 2 of the drawings, the triodes 31, 32, and 33 are the first stages respectively, of the amplifiers 16, 22, and 26. The grid of tube 33 is connected to the displacement signal transmitter 13 through a suitable resistor 35, while the plate thereof is connected to the succeeding stages of the amplifier 16 and phase discriminator networks, herein indicated by a block diagram 36; the output thereof being indicated as connected to the servo-motor 17. The grid of triode 32 is similarly connected to the source of bank displacement signal of the artificial horizon 21 through a resistor 37, and the plate thereof is indicated as connected to a phase discriminator 38, and thence to the servo-motor 23. The grid of tube 33 is connected to the source of pitch signal through a resistor 39, the output of which is connected to a phase discriminator 40.

The resistor 35 is connected in series by a lead 41 to an adjustable resistor 42 and in series with a second adjustable resistor 43. The resistor 42 is connected across the follow back signal transmitter 17 while the resistor 43 is connected across the source of rate signal of the rate of turn gyro 20. The resistor 37 is connected in series by a lead 44 to a variable resistor 45 which is connected across the output of the follow-back transmitter 25. The grid resistor 39 is similarly connected by a lead 46 to an adjustable resistor 47 connected across the follow-back transmitter 29 of the rudder channel.

The resistors 42, 43, 45, and 47 are located in the adaptor 30 where adjustments as to ohmic value may be readily made so that the response of the automatic pilot system may be altered to suit the particular characteristics of the aircraft in which it is installed.

For a further and more detailed description of the automatic pilot system hereinabove described, reference may be made to the aforesaid copending application bearing Serial No. 516,488.

Means is now provided to produce signal voltages of proper phase and amplitude as a function of the displacement of a turn control knob and to add the resultant signal voltages to the input of the rudder and aileron amplifiers for actuating the rudder and aileron surfaces to bring about a coordinated turn of the aircraft on which the pilot system is mounted.

To this end there is provided in the turn controller 50 a rotary transformer 51 having a rotor coil 52 connected to a suitable source of alternating potential 53, and a stator coil 54. The rotor coil 52 is provided with a turn control knob 55 readily accessible to the pilot. Rotation of the turn control knob 55 from a neutral position will displace the rotor coil 52 from its zero electrical position. The displacement of the rotor will induce in the stator coil 54 a voltage whose amplitude is in accordance with the degree of displacement and whose phase is dependent on the direction of displacement. It will be obvious to those skilled in the art that other means may be employed to derive this initial displacement signal.

The displacement of the control knob 55 from its neutral position will open switch 56 in the energizing circuit of the magnetic clutch 14, by means of a cam or other means (not shown). The opening of the switch 56 will open the energizing circuit of the magnetic clutch to uncouple the displacement signal transmitter 13 from the master direction indicator 12. In making a turn the displacement signal transmitter 13 is disconnected, the transmitter being returned to its zero electrical position by the centering device described. No displacement signal is therefore available across the grid resistor 35 of the rudder amplifier 16. Upon completion of the turn, the knob being returned to its initial position, will permit switch 56 to close again to couple the transmitter 13 to the indicator 12. The pilot system 10 will then keep the craft on the new heading.

The stator winding 54 is connected by leads 58 to the primary winding 59 of a transformer 60. The transformer 60 is provided with three secondary windings 61, 62, and 63; the secondaries 61 and 62 having one end grounded, while the secondary 63 is center-tapped to ground.

The secondary winding 61 is connected by a lead 64 through a variable resistor 65 to the grid 66 of a triode tube 67. The indirectly heated cathode 68 of the tube is connected through a variable resistor 69 to ground, while the plate 70 thereof is connected by lead 71 through the primary winding 72 of a transformer 73 to B+ supply. The secondary winding 74 of the output transformer is connected across a variable resistor 75, said resistor being grounded at one end and connected in series with resistors 43 and 42 of the rudder amplifier 16 at the other end.

Referring to Fig. 3 of the drawings, curve A thereon illustrates a non-linear curve of rudder displacement signal voltages with respect to rate of turn having a drooping characteristic found to be desirable in placing an aircraft in a coordinated turn.

To obtain a voltage output of the character shown by the curve A of Fig. 4, the value of the resistor 69 in the cathode circuit of the triode 67 is adjusted to provide a small negative bias. (See Fig. 4.) For small values of signal voltage applied to the grid 66 from the secondary winding 61, the tube 67 will operate as a Class A amplifier, and for large values of signal voltages will attempt to operate as a Class B amplifier. Due to the resistor 65 in the circuit of grid 66, Class B operation will be limited so that amplification will fall off with the amplitude signal voltages. The output of tube 67 will have the drooping characteristic hereinbefore indicated as desirable, the resultant curve being determined by the values of the grid resistor 65 and the bias resistor 69.

The output of tube 67 is coupled by way of the transformer 73 across the resistor 75 connected to the input of the rudder channel amplifier 16. The voltage applied to the pilot channel for a given setting of the turn control knob 55 may be adjusted by varying the value of this resistor. Thus a rudder signal voltage is applied to the input of the amplifier, the amplitude of which is determined by the displacement of the control knob 55 and the phase of the signal by the direction of displacement.

Due to the rudder displacement signal applied to the rudder channel amplifier, the rudder 18 will be deflected in accordance with the signal. The rate of turn gyro precessing due to the turn will develop a signal opposing the displacement signal set in. When the rate of turn of the craft is in agreement with the displacement signal set in, the rate signal will equal the displacement signal. The follow-back transmitter 19 being driven by the rudder servo 17 will be increasing the follow-up voltage being applied across the resistor 42. The reverse polarity of the follow-up voltage will return the rudder 18 to its feathered position when the craft has attained its proper rate of turn. The turn control knob 55 having been returned to its neutral position, will reconnect the displacement signal transmitter 13 to bring the craft once again under the control of the pilot system to maintain the craft on its new heading.

The aileron displacement signal induced in the secondary transformer winding 62 is impressed on the grid 79 of the triode 80 through a lead 81. The indirectly heated cathode 82 of the tube 80 is connected through an adjustable resistor 83 to ground, while the plate is connected by lead 84 through the primary winding 85 of a coupling transformer 86 to B+ supply. The secondary winding 87 of the transformer is connected across an adjustable resistor 88 connected at one end in series with the resistor 45 of the aileron channel 22, and at the other end to ground.

The aileron displacement signal developed by the turn controller 50 should provide proper bank of the craft when in a turn. Small deflections of the ailerons are required for small rates of turn of the craft, while increasingly larger deflections are required for greater rates of turn. In Fig. 3 of the drawings curve B illustrates the required aileron displacement voltage to bank the craft for various rates of turn.

To obtain a voltage output from the triode 80 approximating that shown in curve B of Fig. 3, the resistor 83 is adjusted to apply a bias well below the toe of the characteristic curve illustrated in Fig. 4. The tube 80 will be relatively insensitive to small displacement voltages applied to the grid 79, the gain increasing in increasing increments as the signal amplitude increases. The increasing gain of the tube 80 will provide the rising characteristic found desirable for aileron operation. The actual amplitude of aileron signal impressed on the aileron channel may be varied by the adjustment of the value of the resistor 88.

The aircraft is kept on a level flight path by the bank displacement signals of the artificial horizon gyro 21 impressed on the grid resistor 37 of the aileron channel 22. The aileron signal developed by the triode 80 is impressed on the resistor 88 in opposition to any signal which may be developed by the gyro 21. Thus, the aileron displacement signal developed by the displacement of the control knob 55 will operate the aileron servo motor 23 to position the aileron surfaces 24 to bank the aircraft. The banking of the craft will provide a bank signal by the artificial horizon gyro 21 across resistor 37 to nullify the aileron signal impressed. The follow-back transmitter 25 displaced by the servo 23 will also develop a signal in opposition to the aileron signal turned in. Thus when the craft is at a proper bank angle the aileron surfaces are feathered. A return of the control knob 55 will wipe out the aileron signal, permitting the signals of the gyro 21 to bring the craft to a level flight position.

Means is now provided to develop signal voltages which will operate the elevator servomotor 27 to compensate for the inherent loss of altitude by the craft, additional compensation being made for the greater loss in altitude of the plane in a left turn.

To this end the displacement signal induced in the secondary winding 63 is applied through leads 90 and 91 to a phase discriminator circuit comprising the two triodes 92 and 93. A discriminator circuit is required in the elevator channel so that the elevator signal applied is of the same polarity regardless of the direction of displacement of the control knob 55. An "up" elevator signal is required in making the turns.

The lead 90 connects one end of the grounded center tapped secondary winding 63 to the grid 94 of triode 92, while lead 91 connects the other end of the winding to the grid 95 of the tube 93. The indirectly heated cathodes 96 and 97 of the tubes 92, 93 are connected through a common bias resistor 98 to ground. The value of resistor 98 is selected to provide an output characteristic similar to that hereinbefore described in connection with the aileron channel.

The plate 100 of tube 92 is connected by a lead 101 through the primary winding 102 of a coupling transformer 103 to a suitable source of alternating potential. The output of tube 93 is connected by way of a plate 105 and a lead 106 through the primary winding 107 of a coupling transformer 108 to the source of alternating potential. The secondary winding 110 of transformer 103 is connected across a variable resistor 111, while the secondary winding 112 is similarly connected across a variable resistor 113. The resistors 111 and 113 are series connected to the resistor 47 of the elevator channel 26.

The rotation of the control knob 55 will provide a signal across the secondary winding 63, the amplitude of which will be proportional to the degree of displacement, and the phase in accordance with the direction of the displacement. Thus, the voltages applied to the grids 94 and 95 of the triodes 92 and 93 are 180° out of phase. The phase of the voltage placed on the grids and the phase of the plate voltage will determine which of the two tubes will operate. Assuming that tube 92 will be operated upon clockwise displacement of the knob 55 to initiate a right turn, a voltage will appear across the resistor 111 but none across the resistor 113. Similarly when a left turn is required, by turning the knob 55 counter clockwise a voltage will appear across the resistor 113 but not across resistor 111. The amplitude of the voltages in the resistors 111 and 113 is adjusted so that the gain obtained is greater for operation of tube 93 than that obtained from tube 92. Curves C and D of Fig. 3 show the desired voltage characteristics for a left and right turn, respectively.

The voltages appearing across the resistors 111 or 113 will operate the elevator servomotor 27 to deflect the elevator surfaces 28 to an "up" position. The degree of "up" elevator provided will be determined by the direction of turn called for by the displacement of the control knob 55. The pitch signals of the artificial horizon gyro 21 and the signal voltages developed by the displacement of the follow-back transmitter 29 by the operation of the servo 27 will combine in the input of the elevator channel to control the actuation of the elevator surfaces in the manner heretofore described in connection with the rudder and aileron surfaces. A return of the control knob 55 to its zero position will again place the aircraft in level flight on the new heading under the control of the automatic pilot system 10.

The resistors 75, 88, 111 and 113 have been indicated as being located in the adaptor 30 mounted on the control panel of the craft so that upon installation of the system disclosed the gain control may readily be adjusted to match the characteristics of the craft in which the system is installed.

It will thus be seen that there is provided a coordinated turn controller for an automatic pilot system in which the several objects of this invention are achieved, and which is well adapted to meet the conditions of practical use.

As various possible embodiments might be made of the above invention, and as various changes may be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. A coordinated turn controller for an automatic pilot system having aileron and rudder surface actuating motors, comprising a displaceable member, means for deriving a signal voltage upon displacement of said member from an initial position, the amplitude of which is dependent upon the degree of displacement of said member and the phase upon the direction of displacement from the initial posiiton, means for dividing the initial signal voltage into two signal voltages, and an amplifier stage for each of said two signal voltages, one of said stages being biased to provide a voltage output having a rising characteristic and the other of said stages being biased to provide a voltage output having a drooping characteristic to operate said actuating motors.

2. A coordinated turn controller for an automatic pilot system having aileron and rudder surface actuating motors, comprising a displaceable member, means for deriving a signal voltage upon displacement of said member from an inital position, the amplitude of which is dependent upon the degree of displacement of said member, and the phase upon the direction of displacement from the initial position, electronic means including a vacuum tube having a small negative bias thereon and a second vacuum tube having a large negative bias thereon, and means for applying a signal voltage to each of said tubes, the output of said tubes having different characteristics to operate said actuating motors.

3. A coordinated turn controller for an automatic pilot system having aileron and rudder surface actuating motors, comprising a displaceable member, means for deriving a signal voltage upon displacement of said member from an initial position, the amplitude of which is dependent upon the degree of displacement of said member, and the phase upon the direction of displacement from the initial position, electronic means including a vacuum tube having a small negative bias thereon and a second vacuum tube having a large negative bias thereon, and means for applying a signal voltage to each of said tubes, the output of said tubes having different characteristics to operate said actuating motors, the output of said first tube controlling the rudder actuating motor.

4. A coordinated turn controller for an automatic pilot system for a mobile craft having aileron and rudder actuating motors controlled by direction, rate and attitude signal voltages, comprising a displaceable member, means for deriving a signal voltage upon displacement of said member from an initial position, the amplitude of which is dependent upon the degree of displacement, the phase upon the direction of displacement from the initial position, means for disconnecting the source of direction signal voltages of said system upon displacement of said member, means for deriving bank and turn signal voltages of varying amplitude from said derived signal voltage, means for imparting a drooping characteristic to said turn signal voltage, means for imparting a rising characteristic to said bank signal voltage, and means for adding the derived bank and turn signal voltages into said pilot system to operate said actuating motors to place the craft into a properly banked turn dependent upon the degree and direction of the displacement of said member.

5. A coordinated turn controller for an automatic pilot system having aileron, rudder and elevator surface actuating motors, comprising a source of signal voltage, a displaceable member for varying the amplitude of said signal voltage source upon displacement thereof from an initial position, the polarity of said voltage being dependent upon the direction of the displacement of said member from the initial position, means for deriving bank, turn and elevator signal voltages from said variable signal voltage to operate said actuating motors, and means for imparting a drooping characteristic to said derived turn signal voltage and a rising characteristic to said bank and elevator signal voltages.

6. A coordinated turn controller for an automatic pilot system having aileron, rudder and elevator surface actuating motors, comprising a source of signal voltage, a displaceable member for varying the amplitude of said voltage source upon displacement thereof from an initial position, the polarity of said voltage being dependent upon the direction of displacement of said member from the initial position, means for deriving bank, turn and elevator signal voltages from said variable signal source to operate said actuating motors, and means for imparting a drooping characteristic to at least one of said derived signal voltages and a rising characteristic to at least one of the two remaining derived signal voltages.

7. A coordinated turn controller for an automatic pilot system having aileron, rudder, and elevator surface actuating motors, comprising a displaceable member, means for deriving a signal voltage upon displacement of said member from an initial position, the amplitude of which is dependent upon the degree of displacement of said member and the phase upon the direction of displacement from the initial position, means for dividing the derived signal voltages into three signal voltages, and an amplifier stage for each of said three signal voltages, one of said stages being biased to provide an output signal voltage having a drooping characteristic and the remaining two stages being biased to provide output signal voltages having rising characteristics to operate said actuating motors.

8. A coordinated turn controller for an automatic pilot system having aileron, rudder and elevator surface actuating motors, comprising a displaceable member, means for deriving a signal voltage upon displacement of said member from an initial position, the amplitude of which is dependent upon the degree of displacement of said member, and the phase upon the direction of displacement from the initial position, electronic means including a vacuum tube having a small negative bias thereon, a second vacuum tube having a large negative bias thereon and two other vacuum tubes connected as a phase discriminator having a large negative bias thereon, and means for applying the signal voltage to each of said tubes, the output of said tubes having different characteristics to operate said actuating motors.

9. A coordinated turn controller for an automatic pilot system having aileron, rudder and elevator surface actuating motors, comprising a displaceable member, means for deriving a signal voltage upon displacement of said member from an initial position, the amplitude of which is dependent upon the degree of displacement of said member, and the phase upon the direction of displacement from the initial position, electronic means including a vacuum tube having a small negative bias thereon, a second vacuum tube having a large negative bias thereon and two other vacuum tubes in push-pull arrangement having a large negative bias thereon, and means for applying the signal voltage to each of said tubes, the output of said tubes having different characteristics to operate said actuating motors, the first of said tubes controlling the rudder actuating motor, the second controlling the aileron actuating motor and the push-pull arrangement controlling the elevator operating motor.

10. A coordinated turn controller for an automatic pilot system for an aircraft having aileron, rudder and elevator actuating motors controlled by direction, rate and attitude signal voltages, comprising a displaceable member, means for deriving a signal voltage upon displacement of said member from an initial position, the amplitude of which is dependent upon the degree of displacement, the phase upon the direction of displacement from the initial position, means for disconnecting the source of direction signal voltages of said system upon displacement of said member, means for deriving bank, turn and "up" elevator signal voltages from said derived signal voltage, means for imparting a drooping characteristic to one of said derived signal voltages and a rising characteristic to at least one of the two remaining derived signal voltages, and means for adding the derived bank, turn and elevator signal voltages into said pilot system to operate said actuating motors to place the craft into a properly banked turn and for maintaining the craft at approximately the same altitude during the turn upon displacement of said member.

11. In a turn controller for an automatic pilot system for an aircraft having an elevator actuating motor, the combination comprising a displaceable member, means for developing a signal voltage upon displacement of said member from an initial position, the amplitude and polarity of the signal voltage depending on the degree and direction of the member displacement, a phase discriminator circuit receiving said signal voltage and deriving at its output an up-elevator signal therefrom for both left and right turns of the craft, and means associated with said circuit for varying the characteristic of said up-elevator signal depending upon the direction of craft turn, the output of said circuit operating said actuating motor.

12. In a turn controller for an automatic pilot system for aircraft having an elevator actuating motor, the combination comprising a displaceable member, means for developing signal voltages upon displacement of said member from a neutral position, the amplitude and phase of said voltage depending upon the degree and direction of member displacement, a phase discriminator circuit receiving said signal voltage and varying the characteristic thereof, and means for adjusting the amplitude of the output voltages of said circuit to provide a voltage of greater amplitude for operating the actuating motor in up elevator position when a left turn is made than when a right turn is made.

13. A coordinated turn controller for an aircraft automatic pilot system having aileron and rudder surface actuating motors, comprising a displaceable member, means for deriving a signal voltage upon displacement of said member from an initial position, the amplitude of which is dependent upon the degree of displacement of said member, means for deriving from said signal voltage a control signal having a characteristic which droops with an increased value of said signal voltage for operating one of said motors, and means for deriving from said signal voltage a control signal having a characteristic which rises with an increased value of said signal voltage for operating the other of said motors.

14. A coordinated turn controller for an aircraft automatic pilot system having aileron and rudder surface actuating motors, comprising a movable member having a normally centered position which, when displaced, from said centered position operates said motors in accordance with the degree of member displacement, means responsive to displacement of said member for developing a control signal having a characteristic which droops with increasing member displacement for operating one of said motors, and means responsive to displacement of said member for developing a control signal having a characteristic which rises with increasing member displacement for operating the other of said motors.

15. A coordinated turn controller for an aircraft automatic pilot system having aileron and rudder surface actuating motors, comprising a movable member having a normally centered position which when displaced from said centered position operates said motors in accordance with the degree of member displacement, means responsive to displacement of said member for developing a control signal having a characteristic which droops with increasing member displacement for operating said rudder surface actuating motor, and means responsive to displacement of said member for developing a control signal having a characteristic which increases with increasing member displacement for operating said aileron surface actuating motor.

16. In a turn controller for an automatic pilot system for an aircraft having an elevator actuating motor, the combination comprising a movable member displaceable in one direction for subjecting the craft to a left turn and displaceable in another direction for subjecting the craft to a right turn, means for developing a signal voltage upon displacement of said member from an initial position, the amplitude and polarity of the signal voltage depending upon the degree and direction of displacement of said member, means for deriving from said signal voltage during displacement of said member in either direction an up-elevator signal for operating said motor, and means associated with said last-named means whereby said up-elevator signal for one direction of displacement of said member has a value different from the value of said up-elevator signal for the other direction of displacement of said member.

17. In a turn controller for an automatic pilot system for an aircraft having an elevator actuating motor, the combination comprising a movable member displaceable in one direction for subjecting the craft to a left turn and displaceable in another direction for subjecting the craft to a right turn, means responsive to displacement of said member in either direction for developing an up-elevator signal for operating said motor, and means associated with said last-named means whereby said up-elevator signal for one direction of displacement of said member has a value different from the value of said up-elevator signal for the other direction of displacement of said member.

18. In a turn controller for an automatic pilot system for an aircraft having an elevator actuating motor, the combination comprising a movable member displaceable in one direction for subjecting the craft to a left turn and displaceable in another direction for subjecting the craft to a right turn, means responsive to displacement of said member in either direction for developing an up-elevator signal for operating said motor, and means associated with said last-named means whereby said up-eleveator signal for one direction of displacement of said member calling for a left turn for the craft is greater than the up-elevator signal for the other direction of displacement of said member calling for a right turn for the craft.

PAUL A. NOXON.

REFERENCES CITED

The following references are of record in the file of this patent:

UNITED STATES PATENTS

| Number | Name | Date |
|---|---|---|
| 1,801,948 | Boykow | Apr. 21, 1931 |
| 1,869,840 | Boykow | Aug. 2, 1932 |
| 2,005,530 | Boykow | June 18, 1935 |
| 2,066,194 | Bates | Dec. 29, 1936 |
| 2,415,430 | Frische et al. | Feb. 11, 1947 |
| 2,416,097 | Hansen et al. | Feb. 18, 1947 |
| 2,423,337 | Moseley | July 1, 1947 |
| 2,471,821 | Kutzler et al. | May 31, 1949 |